United States Patent [19]

Wilcoxon

[11] Patent Number: 5,147,841
[45] Date of Patent: Sep. 15, 1992

[54] METHOD FOR THE PREPARATION OF METAL COLLOIDS IN INVERSE MICELLES AND PRODUCT PREFERRED BY THE METHOD

[75] Inventor: Jess P. Wilcoxon, Albuquerque, N. Mex.

[73] Assignee: The United States of America as represented by the United States Department of Energy, Washington, D.C.

[21] Appl. No.: 617,325

[22] Filed: Nov. 23, 1990

[51] Int. Cl.$^5$ .................. B01J 31/02; B01J 31/12; B01J 13/00
[52] U.S. Cl. ..................................... 502/173; 252/309
[58] Field of Search ................ 502/173, 344; 252/309

[56] References Cited

U.S. PATENT DOCUMENTS

| | | | |
|---|---|---|---|
| 3,399,145 | 8/1968 | Martinek et al. | 252/309 |
| 4,339,345 | 7/1982 | Nakao et al. | 252/309 |
| 4,390,514 | 6/1983 | Chianelli et al. | 423/509 |
| 4,425,261 | 1/1984 | Stenius et al. | 502/339 |
| 4,593,016 | 6/1986 | Amelio et al. | 502/339 |
| 4,842,766 | 6/1989 | Blehm et al. | 252/309 |

FOREIGN PATENT DOCUMENTS 53-109879 9/1978 Japan ................................. 502/173

OTHER PUBLICATIONS

G. Boutonnet et al., "The Preparation of Monodisperse Colloidal Metal Particles From Microemulsions", *Colloids and Surfaces*, vol. 5, 1982, pp. 209–225.
M. Boutonnet et al., "Monodisperse Colloidal Metal Particles From Nonaqueous Solutions: Catalytic Behavior in Hydrogenation of But-1-ene of Platinum, Palladium, and Rhodium Particles Supported on Pumice", Journal of Catalysis, vol. 103, 1987, pp. 95–104.
J. Belloni et al., "Radiation Induced Preparation of Metal Catalysts: Iridium Aggregates", *Nouveau Journal de Chimie*, vol. 6, No. 11, pp. 507–509, 1982.
E. Amouyal et al., "Photochemical Production of Hydrogen From Water", Journal of Photochemistry, vol. 29, pp. 227–242, 1985.
J. Wilcoxon et al., "Formation of Metal Colloids in Inverse Micelles and Microemulsions", Proceedings of the Fall MRS, 1989.

*Primary Examiner*—W. J. Shine
*Attorney, Agent, or Firm*—Armand McMillan; James H. Chafin; William R. Moser

[57] ABSTRACT

A method is provided for preparing catalytic elemental metal colloidal particles (e.g. gold, palladium, silver, rhodium, iridium, nickel, iron, platinum, molybdenum) or colloidal alloy particles (silver/iridium or platinum/gold). A homogeneous inverse micelle solution of a metal salt is first formed in a metal-salt solvent comprised of a surfactant (e.g. a nonionic or cationic surfactant) and an organic solvent. The size and number of inverse micelles is controlled by the proportions of the surfactant and the solvent. Then, the metal salt is reduced (by chemical reduction or by a pulsed or continuous wave UV laser) to colloidal particles of elemental metal. After their formation, the colloidal metal particles can be stabilized by reaction with materials that permanently add surface stabilizing groups to the surface of the colloidal metal particles. The sizes of the colloidal elemental metal particles and their size distribution is determined by the size and number of the inverse micelles. A second salt can be added with further reduction to form the colloidal alloy particles. After the colloidal elemental metal particles are formed, the homogeneous solution distributes to two phases, one phase rich in colloidal elemental metal particles and the other phase rich in surfactant. The colloidal elemental metal particles from one phase can be dried to form a powder useful as a catalyst. Surfactant can be recovered and recycled from the phase rich in surfactant.

36 Claims, No Drawings

METHOD FOR THE PREPARATION OF METAL COLLOIDS IN INVERSE MICELLES AND PRODUCT PREFERRED BY THE METHOD

The U.S. Government has rights in this invention pursuant to Contract No. DE-AC04-76DP00789 between the U.S. Department of Energy and the American Telephone and Telegraph Company.

BACKGROUND OF THE INVENTION

The present invention relates to the field of catalytic particles, and more particularly to colloidal metal particles used as catalysts.

In the art of forming catalytic colloidal metal particles, U.S. Pat. No. 4,425,261 of Stenius et al. discloses a method for preparing particles of metal in the platinum group whereby a metal salt is dissolved in a microemulsion, and the salt is reduced by hydrazine to form elemental metal particles. Several problems are associated with metal particles prepared in accordance with the Stenius et al. method. One problem is that production of iridium catalysts is very difficult. Another problem is that the platinum group particles that are formed are not stable in solution. Another problem is that the suspended metal particles will aggregate when the suspending solution is diluted.

In "Radiation Induced Preparation of Metal Catalysts: Iridium Aggregates", by Belloni in Nouveau Journal De Chimie, Vol. 6, No. 11-1982, p. 507, there is a disclosure that elemental iridium particles are prepared by exposing an aqueous solution of hexachloroiridic acid, in the presence of polyvinyl alcohol surfactant, to a radioactive cobalt-60 source. The dangers and environmental problems associated with radioactive sources are well known and best avoided.

Other patents disclose methods of preparing catalytic particles which are not elemental metal particles. These patents include U.S. Pat. Nos. 4,390,514 and 4,339,345.

Catalytic metal particles are employed in a number of ways in the prior art. For example, the catalytic particles are often supported on catalyst substrates that are contacted with the reactants whose reaction the particles are to catalyze. Other prior art methods either bring catalytic particles to the reactants or bring the reactants to the catalytic particles. It would be desirable, however, if the catalytic particles could be made in situ in the presence of the reactants.

The efficient use of expensive material implies that small, stable colloidal particles be formed in media appropriate to the desired chemical reaction. Thus, forming colloidal particles that are stable in water is not useful if the desired chemical reaction is to take place in toluene. It would be desirable, therefore, if colloidal particles could be formed that are stable in both aqueous and nonaqueous solvents.

SUMMARY OF THE INVENTION

Accordingly, it is an object of the present invention to provide a method for producing catalytic colloidal metal particles that are stable in solution.

Another object of the invention is to provide a method for producing stable colloidal iridium particles.

Another object is to provide a method for preparing suspensions of catalytic colloidal metal particles that do not aggregate when the suspension is diluted.

Still another object of the invention is to provide a method for preparing catalytic colloidal metal particles in situ in the presence of the reactants whose reaction is to be catalyzed.

An additional object of the invention is to provide colloidal metal particles that are stable in both aqueous and nonaqueous solvents.

Still another object of the invention is to provide a method for producing colloidal elemental metal catalyst particles without using radioactive materials.

Additional objects, advantages, and novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved method is provided for preparing catalytic elemental metal colloidal particles. With the invention, a homogeneous inverse micelle solution of a metal salt is first formed in a metal-salt solvent comprised of a surfactant and an organic solvent. It is understood that an inverse micelle, in accordance with the invention, has a hydrophilic component centrally located in a sphere-like micelle structure with a hydrophobic component radiating out from the center. The homogeneous inverse micelle solution of the invention is thermodynamically stable for virtually an indefinite period of time. The inverse micelle environment is formed by careful selection of a surfactant and organic solvent in which inverse micelles can exist, as described in greater detail hereinbelow.

In accordance with an additional aspect of the invention, then, the ionic metal in the metal salt is reduced by electromagnetic radiation to colloidal particles of elemental metal.

In accordance with yet another aspect of the invention, once the stable homogeneous inverse micelle solution of a metal salt in the metal-salt solvent is formed, and once colloidal elemental metal particles have been formed by reduction of the dissolved metal salt (either by chemical reducing agents or by electromagnetic radiation), then the colloidal metal particles that are formed are stabilized so as not to aggregate when the particles are dried to a powder and when the powdered particles are suspended in wide range of solvents with a wide range of dilutions.

Stabilization of the colloidal elemental particles of the invention is obtained with materials that permanently add surface stabilizing groups to the surface of the colloidal metal particles. Stabilization of the metal particles is obtained by several different approaches. In one approach, the colloidal elemental particles are stabilized by a the presence of a small amount of surfactant that adheres to the metal particles. The surfactant is present in the homogeneous inverse micelle solution, and a small amount of this surfactant adheres to the colloidal elemental particles. With this approach, most of the surfactant present in the homogeneous inverse micelle solution is free to separate in a second phase separate from the colloidal particles. Then, the surfactant in the second phase can be recovered for recycling.

In a second approach, the colloidal elemental particles are stabilized by reaction with compounds that react with the surfaces of the already formed particles.

In accordance with still another aspect of the invention, a method for producing colloidal metal particles is comprised of the following steps. A homogeneous inverse micelle solution of a metal salt in a metal-salt solvent is formed at or above a first temperature such that the solution is a single phase. At or above the first temperature, the metal salt is reduced such that colloidal elemental metal particles are formed, whereby the colloidal particles are suspended in the metal-salt solvent. Then, the metal-salt solvent is permitted to cool to a second temperature at which two phases form, with the colloidal elemental metal particles being concentrated in one of the phases and excess surfactant being concentrated in the other phase which can be treated to separate the surfactant for recycling.

In accordance with yet another aspect of the invention, a method is provided for forming colloidal particles comprised of metal alloys. With this aspect of the invention, two salts containing two different metals are dissolved and reduced to elemental metal by exposure to electromagnetic radiation, such that colloidal particles, an alloy of the two metals, is formed. More specifically, the reduction of the metal salt to colloidal metal particles by electromagnetic radiation can be carried out by employing photolytic reduction with a UV (ultraviolet) laser. In addition, the colloidal metal particles can be stabilized by contact with an organometallic compound.

In forming the metal alloy particles, a first metal salt is first reduced to elemental metal particles (by a first reducing agent such as a chemical reducing agent or a first electromagnetic radiation), the first metal reduction being conducted as a homogeneous nucleation and growth stage. Then a second metal salt is added, and second elemental metal is reduced (by a second reducing agent such as a chemical reducing agent or a second electromagnetic radiation) and forms on the surfaces of the first metal particles to form the alloy particles. The second metal forming on the first metal is conducted as a heterogeneous nucleation and growth stage.

In accordance with yet another aspect of the invention, colloidal elemental metal particles are provided in powder form where the powder particles are stabilized with a number of stabilizing agents. With one product of the invention, colloidal elemental metal particles of powder have a nonionic surfactant (e.g. octaethylene glycol monodecyl ether) adhered to the metal particles. With another product of the invention, colloidal elemental metal particles of powder have a cationic surfactant, e.g. didodecyldimethylammonium bromide (DDAB), adhered to the metal particles. With yet another product of the invention, colloidal elemental metal particles of powder have an organometallic material (e.g. mesityl gold) adhered to the metal particles. With still another product of the invention, colloidal elemental metal particles of powder have an organic thiol (e.g. cyclohexane thiol) adhered to the metal particles.

Several important benefits are realized with the invention. Catalyst particles are obtained which perform their catalyst function without being deposited on a catalyst support. With the invention, the colloidal catalyst particles form powders that can be brought into suspension in a wide range of solvents and with a wide range of dilutions being stable in suspension without falling out of suspension.

Still another benefit obtained by the invention is that the actual phase behavior of the inverse micelle solution is used to control the size of the colloidal elemental metal particles and the size distribution of the particles.

Still other objects and benefits of the present invention will become readily apparent to those skilled in this art from the following description. However, the description should be regarded as illustrative in nature and not as restrictive.

DETAILED DESCRIPTION

Although the phenomena occurring within the method of the invention may not be fully and completely understood, a theoretical explanation is provided herein in order to lend greater understanding as to the operation of the invention.

With the invention, catalyst formation relies on the inherently microheterogeneous structure of solutions called inverse micelles or microemulsions (when the inverse micelle includes a liquid in the interior of the micelle) to limit the extent of aggregation of metals in solutions. In effect, the small ($\sim 10$–$300$ Å) spherical droplets of surfactant act as microscopic chemical reactors, limiting the extent of colloid growth.

In the process, a metal salt (e.g. $HAuCl_4$), which is normally quite insoluble in a pure organic phase (e.g. cyclohexane), is solubilized by addition of 1–10 wt % of a nonionic surfactant in the family $C_iE_j$. These surfactants, being uncharged, have minimum effects on the metal salts themselves and are unreactive towards reducing agents such as hydrazine or sodium borohydride. In the case of inverse micelles, the salt is directly dissolved in the solution. In the case of inverse microemulsions, the salt is first dissolved at the desired concentration in a first liquid (e.g. water), and the first liquid is then solubilized along with the salt in the interior of the micelles. By careful selection of surfactant type and solvent, the amount of first liquid addition may be quite large (e.g. up to 60 first liquid molecules per surfactant molecule). The added first liquid controls the size of the droplets and is used, together with the amount of metal salt, to control the final metal colloid size and number density of colloidal particles.

In pure inverse micelle systems the average number of metal ions per micelle controls the final colloid size. When a reducing agent, hydrazine, is added, the many metal ions become quickly reduced to neutral metal. Nucleation sites then exist uniformly throughout the solution wherever a micelle contains one or more metal atoms. Aggregation occurs when two micelles collide and exchange contents, with larger clusters growing at the expense of smaller ones, until all the available metal is used up. The colloidal particles are then stabilized by the absorbed surfactant, and are indefinitely stable over a range of temperatures which depends on the proper choice of a solvent/surfactant micellar system.

To increase the degree of stability of these colloids employing the nonionic surfactants, especially to increase the stability of these colloids in solvents other than the solvents that the colloids are formed in, the method of the invention provides a step of permanently attaching metal organic groups to the surface, (e.g. mesityl gold), which allows complete recovery of the surfactant and reuse in further reduction/colloid formation reactions. It is also possible to add organic thiol molecules, (e.g. cyclohexane thiol), to the colloid solution at a concentration of 10–100 thiols/colloid to replace the surfactant and permanently stabilize the colloids, allowing them to be first centrifuged to a solid pellet, washed, and then dissolved in a wide range of useful organic solvents, including cyclohexane, benzene, toluene, tetrahydrofuran, and hexane. They are insoluble in water or alcohols.

The method of the invention allows dissolution of metal salt containing some water of hydration (e.g. $HAuCl_4$, $H_2IrCl_6$) at levels of up to 0.05M in organic solvents. This allows final colloid particle densities of $10^{16}$/cc, and, with typical sizes of 10 nm, provides specific surface areas of $\sim 174$ m$^2$/gm of metal. This ability to produce particles with large surface areas/unit weight greatly exceeds that of any conventional method of catalyst formation. In addition, the method begins with a homogeneous inverse micelle solution whose metal ion composition can be controlled easily. Being a liquid, the distribution of ions is random and homogeneous, and if the reduction kinetics of the metals, and metal lattice constants are well matched, (e.g. Pt and Au), then we have demonstrated that colloidal particles containing both types of metals may be produced. This allows the properties of the catalyst to be tailored to match the desired chemical reaction. It also should allow reduction of the required amounts of expensive materials, (e.g. Ir), by combining them with less costly metals. An excellent example is Pt coated Fe or Ni colloids for catalytic conversion in coal liquefaction.

The metal reduction step varies somewhat from metal to metal while the nucleation and colloidal growth step is dependent only on the selected surfactant/solvent system, (i.e. nearly universal). The only requirement is that a soluble salt of the desired metal colloid be available.

For reduction, specific protocols have been developed for several important metals including Fe, Ni, Ir, Pt, Ag and Au. Pt, Au, and Ag can be reduced using either a UV laser operating either pulsed, (10 Hz, $\sim 40$ millijoules/pulse, 10 nsec duration), or CW (continuous wave) at $\sim 350$ nm, (average power 0.5 watts). The reaction, however, requires several minutes to go to completion and temperature control and stirring of the reaction vessel are required to prevent undesirable phase separation from occurring. Fe and Ni cannot be reduced photochemically, but must be reduced in an oxygen free atmosphere, (because of the ready formation of oxides), by addition of $NaBH_4$. Ir can be reduced photochemically using a CW UV laser if a photosensitizer such as $AgNO_3$ is added in small quantities. It can also be reduced chemically using $N_2H_4$, as can Au and Pt. The latter chemical reaction and colloid formation requires only $\sim 1-2$ minutes to go to completion, making it the most attractive for practical colloid formation.

The examples presented below are illustrative of application of the methods of the invention.

EXAMPLE 1

Use of Phase Separation in an Inverse Micelle System to Isolate Stable Au, Pd, or NiB Colloids The nonionic surfactant octaethylene glycol monodecyl ether (short name henceforth is $C_{10}E_8$ was purchased from Fluka Chemicals. This surfactant is part of the general group of amphiphiles used in the method covered by this patent in the nonionic surfactant family $C_iE_j$, where i=number of hydrocarbon atoms, j=number of ether groups. These surfactants are available in both research grade (Nikko, Japan) and commercial grade (Fluka, others) purity levels. In this example 10 wt % of $C_{10}E_8$ was first dissolved in octane. $HAuCl_4$ (anhydrous) was then dissolved in this solution at a concentration of $5 \times 10^{-4}$M. The sample was one phase under these conditions. The sample was then Ar gas purged. Hydrazine (5M stock in water) was added at a 2-3 fold molar excess compared to the salt concentration with rapid stirring. The sample clears, darkens, goes purple and finally turns red forming colloidal gold. After $\sim 20$ minutes the sample spontaneously phase separates into two phases with a nearly pure gold colloid upper phase and a lower phase containing the ionic by-products of the reaction with the majority of the surfactant. Some colloid rearrangement continues for several hours as the particle size decreases and the size distribution narrows as established by transmission electron microscopy (TEM) studies. The upper phase is extracted and is stabilized by the remaining surfactant on the gold colloid surface. The colloids are not stable in other solvents at this point but can be made so by adding $\sim 0.1$ wt % of the cationic surfactant didodecyldimethylammonium bromide (DDAB made by Kodak chemicals) which exchanges with the more weakly bound nonionic species on the gold surface. Stability greater than 2 years in the solvent of preparation was established. Particles could be concentrated without aggregation by solvent evaporation to volume fractions greater than 20 vol %. This permits their application as nearly ideal electro-rheological fluids (i.e. they are highly polarizable, being metals, but are stable in a non-conductive oil medium) and in conductive ink spraying (optimally prepared in highly volatile solvents like hexane and pentane). The purification of the hydrophobic colloids from ions via phase separation is a major advantage of this example. Although octane has been used in the solvent for forming the homogeneous inverse micelle, other solvents including saturated hydrocarbons having from five to sixteen carbons can also be employed. In addition, aromatic hydrocarbons such as the toluenes, the xylenes, and benzene can also be employed.

Another cationic surfactant that can be employed with the invention is tridodecylmethylammonium bromide (TMAB).

An important advantage of the colloidal elemental metal particles of the invention which are formed in the presence of a cationic surfactant such as DDAB is that the colloidal metal particles are stable and will not aggregate in the presence of solvents other than the solvents in which the particles are formed. Furthermore, the colloidal elemental metal particles are stable and will not aggregate in the presence of solvents in which the DDAB, by itself, is not soluble. More specifically, DDAB by itself is not soluble in hexadecane. However, with the colloidal elemental metal particles formed in the presence of DDAB, the suspension of particles formed in a solvent containing toluene can be diluted with hexadecane without an aggregation of the colloidal particles, even though the bulk of DDAB that is not adhering to the colloidal elemental metal particles falls out of solution in the presence of the hexadecane.

Variations can be made in the conditions described for Example 1 as follows.

1. Any of the gold salt precursors $AuCl_3$, $NH_4AuCl_4$, $KAuBr_4$ may be used to form gold colloids at concentrations between $1 \times 10^{-5}$M and 0.05M. There are modest variations in particle size with salt precursor type and ion concentration in the 5 nm to 50 nm range. As the metal concentration is increased at constant surfactant concentration, the sample becomes two phase at room temperature (T=25° C.) before reaction. Then the reaction temperature must be elevated (e.g. ~40° C. at $5 \times 10^{-3}$M salt precursor concentration is required to form a single homogeneous phase, proportionally higher temperatures at higher salt concentrations). These gold salt precursor micelle solutions are then reacted as described above and upon lowering the temperature the system phase separates. It is very important to the formation of small, <50 nm particles that the reaction be performed at least 10° C. above the phase boundary. If performed at or below the phase separation temperature, the growth will not be limited and sedimentation will result.

2. NaBH$_4$ (5M stock in water, 2×molar excess) may be used as an alternative chemical reducing agent with an increase in final colloid size of ~10-20 nm compared to hydrazine, except at the lowest salt concentrations (i.e., $<4 \times 10^{-4}$M) where the size is comparable. Photoreduction may be used using a CW Ar ion laser operating at 350 nm at ~300-500 mW while stirring the sample which is immersed in a constant temperature bath. Reaction can be stopped at various times allowing various size particles from (2-50 nm) to be obtained by this method. Exposure greater than ~10 minutes results in irreversible aggregation and sedimentation. A pulsed Nd:YAG laser operating at ~50 mJ/pulse at a rep rate of 10 Hz may be used. Exclusion of dissolved oxygen is crucial to forming small, narrow size distribution particles.

3. Permitted surfactant wt % for successful formation is between 5% and 40 wt %, but the details of the phase separation temperature and permitted reactions temperature changes. In general, higher wt % allows lower reaction temperatures to be used without aggregation occurring.

4. Permitted types of solvents include hydrocarbons from hexane to hexadecane, but details of the phase separation vary systematically with hydrocarbon and the reaction temperature must be adjusted accordingly. Reaction temperatures are lowest with the most hydrophilic (hexane) and much higher (~60° C.) with the most hydrophobic (hexadecane) solvents in this series.

EXAMPLE 2

Use of Novel Reducing Agents (Specifically Sodium Metal in Pellet Form) to Form Gold and Silver Colloidal Particles The method of the invention is water-free so completely novel methods of reduction are possible. In this example any nonionic surfactant from $C_{12}E_3$ to $C_{12}E_8$ is dissolved in a solvent including hexane to hexadecane, or cyclohexane (best with $C_{12}E_5$ and $C_{12}E_6$ in hexane or octane) at a concentration of 5-20 wt % (best at 10 wt %). A metal salt (e.g. HAuCl$_4$, AgNO$_3$) is then added directly to a final concentration between $1 \times 10^{-4}$M and 0.01M (best at ~$1 \times 10^{-3}$M). The sample is Ar purged then injected into a vial containing Na pellets with stirring. Sample turns from golden to clear (fully reduced) in <1 sec, then purple to red color change occurs indicating colloidal gold formation (yellow color for silver) in ~30 sec to 1 min depending on metal salt concentration. Sample is then poured off of pellets and stable, small (<20 nm) colloids of gold or silver are recovered. TEM shows diffraction corresponding to crystalline bulk metal. Final sizes were very small at 8.3 nm as shown in TEM #1 showing Au metal colloids formed in the $C_{12}E_5$/hexane/HAuCl$_4$($5 \times 10^{-4}$M) system.

Variations can be made in the conditions described for Example 2 as follows.

Same protocol applies to RhCl$_3$ to form Rh colloids, NiCl$_2$ to form Ni colloids or FeCl$_3$ to form Fe colloids. Air exclusion is absolutely critical for nickel and iron to avoid oxide formation. Use of other salts such as KAuBr$_4$ as precursors forms less optimal size and size distributions with this method, but allows tuning of the size. For the case of KAuBr$_4$ particles are ~50 nm in average size. Also use of AgClO$_4$ as precursor salt is permitted.

EXAMPLE 3

Use of Phase Boundaries to Control Size in Gold and Silver Metal Colloids

This example is similar to example 1 but the solvent is chosen so that the solvent/surfactant system before salt introduction is two phase at room temperature (T=25° C.). This example is for a 10 wt % solution of $C_{10}E_8$ in dodecane (see variations below). The salt is added to give concentrations between $1 \times 10^{-4}$M and 0.01M. The solution is now two phase with the salt (e.g. NaAuCl$_4$, PdCl$_2$, NiCl$_2$) in the lower surfactant phase before reaction. The $5 \times 10^{-4}$M salt solution is next heated to ~60° C. which is ~30° C. above the phase boundary and the solution becomes homogeneous and single phase. Hydrazine is added as described in example 1. Reaction is complete in less than 1 minute and red colloids (gold), yellow-brown NiB (using NaBH$_4$, as a reductant), Pd (using hydrazine), or silver (using AgNO$_3$ and hydrazine) are formed. The temperature is lowered to 25° C. and the volume ratio of upper metal colloid phase to the lower ion by-product surfactant phase is determined by the wt % of $C_{10}E_8$ used in the precursor micelle system (e.g. 30 wt % gives 50:50 phase volumes). Metal colloids are extracted from the surfactant free upper phase as before. By adjusting the temperature difference to various distances above the phase boundary size control is achieved via alteration of the growth stage of the reaction. For example, for the gold colloid system with the conditions of this example, at 10° C. above the phase boundary the final size is ~150 nm and colloids are purple, for 20° C. above, the final size of the violet colloids is ~50 nm, while at 30° C. above the size is 20-30 nm (this example), and for >30° C. above the colloids are 10-20 nm.

Variations can be made in the conditions described for Example 3 as follows. This variation relates to the use of an ionic surfactant to form Au metal colloids combined with application of organometallics as surface passivation agents for permanent stabilization and powder formation.

The surfactant Aerosol-OT (called AOT hereafter, Fluka Chemicals) is dissolved at 10 wt % in toluene. Then HAuCl$_4$ is dissolved at 0.03M. A two fold molar excess of hydrazine (5M stock in water) is added in an oxygen-free environment. Red metal colloids of size less than 10 nm are formed. Mesityl-Gold, a commercially available organo-gold complex, is dissolved in toluene to form a stock solution at ~0.01M and then enough of this stock is added to the gold colloid solution to achieve a final concentration of $10^{-4}$M in mesityl-gold. This is ~100 molecules/colloid in this example. This binds irreversibly to the gold surface, so the colloids may now be directly formed into a powder by spinning at 15000 RPM in a Beckmann centrifuge, fixed angle rotor for several hours forming a red pellet. Pouring off the supernatant and washing the pellet in toluene and repeating this step results in a surfactant-free red pellet which may be dried or alternatively redissolved in organic solvents such as toluene, xylene, or cyclohexane. TEM and neutron scattering confirms no aggregation occurs during these step. Colloids are very small as shown in TEM #2.

EXAMPLE 4

Use of Surfactant Substitution to Form Fe, NiB, $MoO_2$, Pt, Rh, and Pd.

In this example the formation process is performed in the cationic surfactant/solvent system with didodecyldimethylammonium bromide (DDAB) made by Kodak, at 10 wt % dissolved in toluene. The precursor salts used are $FeCl_3$, $NiCl_2$, $MoO_2Br_2$, $Na_2PtCl_6$, $RhCl_3$, and $PdSo_4$ respectively and are dissolved at concentrations between $1 \times 10^{-4}$M and 0.01M (this example is for $5 \times 10^{-3}$M). Reduction is by $NaBH_4$ in each case (5M stock in water with NaOH) at a 2-fold molar excess at room temperature with vigorous stirring in an Ar purged solution (i.e. under argon gas). Hydrazine may also be used, except for $NiCl_2$, but produces larger, more polydisperse final colloids. All agents are introduced via Hamilton syringe to avoid air introduction. Colored metal solutions are formed and the particles are generally between 2-5 nm in size by TEM. TEM #3 shows the Pd colloids formed by this method. These solutions may be diluted into many other organic solvents (both aliphatic and aromatic) without aggregation, examples being pentane through hexadecane, cyclohexane, toluene, and xylene. It is claimed here that DDAB adheres irreversibly to the metal colloid surface and imparts an effective surface charge. This supposition is supported by the observation that since DDAB is insoluble in, for example, hexadecane, upon said dilution, the bulk DDAB used in the colloid forming stage of this example precipitates out of solution leaving a colored, clear solution of the unaggregated colloids. Lack of aggregation was established by in situ light scattering measurements. Use of this more strongly binding surfactant consistently results in smaller final colloids than use of the $C_iE_j$ surfactants as reported in example 1.

Variations can be made in the conditions described for Example 4 as follows in that Example 4 is also applicable to production of Au, Ag, Sn, U and Th colloids using the same surfactant/solvent system but using $AuCl_3$, $AgNO_3$, $SnCl_2$, $UNO_3$ and $Th(NO_3)_4$ as precursor salts.

Another suitable cationic surfactant that can be used is tridodecylmethylammonium bromide (TMAB).

EXAMPLE 5

Formation of $MoS_2$ and CdS in an Inverse Micelle

In this example no reducing agent is employed. We dissolve $Cd(ClO_4)_2$ (or less optimally $CdCl_2$) in 10 wt % $C_{12}E_5$ in Octane to form a clear homogeneous precursor salt solution at a final salt concentration of $1 \times 10^{-5}$M to $5 \times 10^{-3}$M. Another solution of $Na_2S$ at approximately twice the concentration in the same surfactant/solvent system is prepared. Both solutions are degassed by Ar bubbling and then, with vigorous stirring, one solution is quickly added through a Hamilton syringe to the other. Light yellow CdS of size less than 5 nm is formed as illustrated in TEM #4. Its optical absorbance and light scattering confirm its small size.

To form $MoS_2$ we first make a solution of molybdenum oxalate at $1 \times 10^{-3}$M in the same solvent/surfactant system described in this example. The $Na_2S$ solution described above is added. A CW 350 nm, 300 mW output power beam irradiates the combined solution as described in example 6 leading to photodecomposition of the molybdenum oxalate and formation of colloidal $MoS_2$. Size is 5-20 nm depending on UV exposure time and incident power.

EXAMPLE 6

Photoreduction to Form Ag, Au, Pt, Pd, Ag/Ir, and Pt/Au Metal Colloids and Alloys In this example the precursor surfactant/solvent surfactant solutions are prepared as described in the above examples. We take a specific example of the formation of the Ag/Ir alloy. $AgNO_3$ is dissolved at a concentration of $\sim 2 \times 10^{-4}$M in $C_{12}E_5$ (10 wt %) in octane. The solution is degassed by Ar bubbling. A CW 350 nm wavelength Ar ion laser at 300 mW is used to irradiate the sample while it is immersed in a water bath with stirring of the sample for 1-3 minutes. Approximately 12 nm Ag (yellow) colloids with a characteristic absorbance at 385 nm are formed. Then $\sim 1 \times 10^{-4}$M $H_2IrCl_6$ was added to this solution and was quickly solubilized by stirring in the micelles interior in ionic form. Further laser irradiation for $\sim 5$ minutes resulted in a yellow/brown solution which was identified as colloid Ag/Ir by analytical TEM with the expected composition of 2:1 Ag:Ir. A 1:1 alloy of Au to Pt was formed by the same method using a precursor solution of hexane/$C_{12}E_5$ (10 wt %) containing both $2 \times 10^{-4}$M $NaAuCl_4$ and $2 \times 10^{-4}$M $Na_2PtCl_4$ but using a pulsed YAG laser operating as described in the variations below. TEM #5 shows the small size of the colloid alloys formed. The size variation is also small.

Variations can be made in the conditions described for Example 6 as follows.

For Pt and Pd metal colloids, precursor salt solutions as above are prepared from $Na_2PtCl_4$ or $Na_2PdCl_4$ respectively. A pulsed Nd: YAG laser operating at the third harmonic ($\sim 350$ nm) at $\sim 10-50$ mJ/pulse at the rep rate of 10 Hz is used to effect a photoreduction of the solution. Yellow/brown colloids are formed in $\sim 1-3$ minutes. This laser is better for producing a narrow size distribution than the CW laser method described above. The CW method seems better for gold, silver, and iridium colloid production.

With the procedures described above, colloidal elemental metal particles are produced in powder form in which a small amount of colloid stabilizing agent is adhered to the colloid particles. When the colloidal elemental metal particles are separated from the solvents in which colloid formation takes place, the great bulk of the material added for stabilization separates from the stabilized particles. More specifically, when the inverse micelles are first formed in the homogeneous inverse micelle solution, only a relatively few of the micelles contain the salt that is the precursor to the colloidal elemental metal particles. Most of the micelles that are actually formed are empty; that is they do not contain the colloidal particle precursor. A relatively large amount of inverse micelle forming material is first added because a large number of metal salt ions must be solubilized.

After the colloidal elemental metal particles are formed, and after the colloidal elemental metal particles are stabilized, they are separated from the vast majority of stabilizing agent which is present in excess and does not have particles to adhere to. After the colloidal elemental metal particles are formed, a relatively small amount of metal salt ion is present, and only a small amount of the stabilizing agent need be present to stabilize the colloidal elemental metal particles. Only approximately 1/1,000th of the stabilizer added actually adheres to the colloidal elemental metal particles.

The fact that only a small amount of stabilizing agent adheres to the colloidal elemental metal particles is important from the standpoint of catalysis. When the stabilized colloidal elemental metal particles are used as catalysts, the minor presence of stabilizing agent does not interfere with the ability of the metal particles from serving their catalytic function. If a large amount of stabilizing agent adhered to the metal particles, which may be present in prior art methods, the catalytic function could be significantly impeded.

Another point worthy of emphasis is that with both the nonionic surfactant and the cationic surfactant used to stabilize the colloidal elemental metal particles, both methods are similar in that they employ a phase separation to separate the colloidal elemental metal particles from the bulk of the surfactant. A significant difference, however, is that with the nonionic surfactant, the phase separation takes place by imposing a temperature change. On the other hand, with the cationic surfactant as colloid stabilizer, the phase separation takes place with the addition of a solvent in which the cationic surfactant by itself is insoluble. Generally speaking, aromatic solvents are used to form the homogeneous inverse micelle solution, and aliphatic solvents are added to form the second phase.

Using nonionic surfactants, the range of particle size of the colloidal elemental metal particles is approximately 5 nm–150 nm. Using cationic surfactants, the range of particle size of the colloidal elemental metal particles is approximately 1 nm–50 nm.

In summary, numerous benefits have been described which result from employing the principles of the invention. With the invention a method is provided for producing catalytic colloidal metal particles that are stable in solution. Also, a method is provided for producing stable colloidal iridium particles. With the invention, a method is provided for preparing suspensions of catalytic colloidal metal particles that do not aggregate when the suspension is diluted. Also, with the invention, a method is provided for preparing catalytic colloidal metal particles in situ in the presence of the reactants whose reaction is to be catalyzed. Also, with the invention, a method is provided in which colloidal metal particles are formed that are stable in both aqueous and nonaqueous solvents. Also, with the invention, a method is provided for producing colloidal elemental metal catalyst particles without using radioactive materials.

The foregoing description of the invention has been presented for purposes of illustration and description. It is not intended to be exhaustive or to limit the invention to the precise form disclosed. Obvious modifications or variations are possible in light of the above teachings. The embodiments and examples were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for producing colloidal metal particles, comprising the steps of:
   forming a homogeneous inverse micelle solution of a metal salt in a metal-salt organic solvent containing a surfactant, and
   reducing the metal salt such that colloidal elemental metal particles are formed.

2. The method described in claim 1 wherein the surfactant includes a nonionic surfactant.

3. The method described in claim 2 wherein the nonionic surfactant is selected from the group of nonionic surfactants of the formula $C_iE_j$, where i equals the number of $CH_2$ units and j equals the number of ether groups.

4. The method described in claim 3 wherein the nonionic surfactant is a surfactant of the formula $C_{10}E_8$, having ten $CH_2$ units and having eight ethylene glycol groups.

5. The method described in claim 1 wherein the organic solvent includes a solvent selected from the group consisting of aromatic hydrocarbons.

6. The method described in claim 5 wherein the organic solvent includes a solvent selected from the group consisting of toluenes, xylenes, and benzene hydrocarbons.

7. The method described in claim 1 wherein the organic solvent includes a solvent selected from the group consisting of saturated hydrocarbons having from five to sixteen carbons.

8. The method described in claim 1 wherein the metal salt is reduced by exposure to electromagnetic radiation.

9. The method described in claim 8 wherein the electromagnetic radiation is provided by a laser.

10. The method described in claim 9 wherein the laser provides ultraviolet energy.

11. The method described in claim 9 wherein the laser is a pulsed laser.

12. The method described in claim 9 wherein the laser is a continuous wave laser.

13. A method for producing colloidal metal particles, comprising the steps of:
    forming a homogeneous inverse micelle solution of a metal salt in a metal-salt solvent comprised of a solution of a nonionic surfactant and an organic solvent, and
    reducing the metal salt by exposure to electromagnetic radiation provided by a continuous wave or pulsed UV laser, such that colloidal elemental metal particles are formed.

14. A method for producing colloidal metal particles, comprising the steps of:
    forming a homogeneous inverse micelle solution of a metal salt in a metal-salt organic solvent, containing a surfactant, and
    reducing the metal salt such that colloidal elemental metal particles are formed, and
    reacting the colloidal elemental metal particles with a material that permanently adds a surface stabilizing group to the surface of the colloidal elemental metal particles.

15. The method described in claim 14 wherein the surface stabilized colloidal elemental particles are dried to form a powder.

16. The method described in claim 14 wherein the material that permanently adds a surface stabilizing group to the surface of the colloidal elemental metal particles is an organometallic material.

17. The method described in claim 16 wherein the organometallic material is mesityl gold.

18. The method described in claim 14 wherein the material that permanently adds a surface stabilizing group to the surface of the colloidal elemental metal particles is an organic thiol material.

19. The method described in claim 14 wherein the material that permanently adds a surface stabilizing group to the surface of the colloidal elemental metal particles is a cationic surfactant.

20. The method described in claim 14 wherein the material that permanently adds a surface stabilizing group to the surface of the colloidal elemental metal particles is a cationic surfactant selected from the group consisting of didodecyldimethylammonium bromide and tridodecyl methyl ammonium bromide.

21. The method described in claim 14, further including the step of recovering the surfactant.

22. A method for producing colloidal metal alloy particles, comprising the steps of:
forming a homogeneous inverse micelle solution of a first metal salt in a metal-salt organic solvent containing a surfactant,
reducing the first metal salt by a first reducing agent such that colloidal first elemental metal particles are formed,
adding a solution of a second metal salt, and
reducing the second metal salt by a second reducing agent such that the elemental second metal is formed on the surface of the colloidal first elemental metal particles, whereby colloidal particles of an alloy of the first and second elemental metals is formed.

23. The method described in claim 22 wherein:
the first reducing agent is a quantity of a first electromagnetic radiation, and
the second reducing agent is a quantity of a second electromagnetic radiation.

24. A method for producing colloidal metal particles, comprising the steps of:
forming a homogeneous inverse micelle solution of a metal salt in a metal-salt solvent at or above a first temperature such that the solution is a single phase, the metal-salt solvent containing a surfactant and a hydrocarbon solvent,
reducing the metal salt such that colloidal elemental metal particles are formed, whereby the colloidal particles are suspended in the single phase metal-salt solvent,
permitting the metal-salt solvent to cool to a second temperature at which two phases form, an upper phase and a lower phase, the colloidal elemental metal particles and the hydrocarbon solvent substantially being in the upper phase, and the surfactant substantially being in the lower phase, and
separating the upper phase from the lower phase.

25. The method described in claim 24 wherein the range of particle size of the colloidal elemental metal particles is approximately 5 nm –150 nm.

26. The method described in claim 24 comprising the additional step of recycling surfactant from the lower phase.

27. The method described in claim 24 comprising the additional step of drying the upper phase, whereby a powder is obtained comprised of the colloidal elemental metal particles stabilized by a small amount of stabilizing agent adhering to the particles.

28. The method described in claim 27 wherein the stabilizing agent is selected from the group consisting of a nonionic surfactant, a cationic surfactant, an organometallic compound, and an organic thiol.

29. A colloidal elemental metal particle product in powder form prepared by the method of claim 28.

30. The method described in claim 28, wherein said stabilizing agent is selected from the group consisting of: a nonionic surfactant of the formula $C_iE_j$ where i equals the number of $CH_2$ units and j equals the number of ether groups; didodecyldimethylammonium bromide; tridodecylmethylammonium bromide; mesityl gold; and cyclohexane thiol.

31. A method for producing colloidal metal particles, comprising the steps of:
forming a homogeneous inverse micelle solution of a metal salt in a first metal-salt solvent system such that the solution is a single phase, the metal-salt solvent containing a cationic surfactant and a first organic solvent,
reducing the metal salt such that colloidal elemental metal particles are formed, whereby the colloidal particles are suspended in the single phase metal-salt solvent,
adding a second organic solvent such that two phases form, a first phase and a second phase, the colloidal elemental metal particles and the first solvent substantially being in the first phase, and the cationic surfactant substantially being in the second phase, in the second solvent, and
separating the first phase from the second phase.

32. The method described in claim 31 wherein the first solvent is an aromatic solvent and wherein the second solvent is an aliphatic solvent.

33. The method described in claim 31 wherein the range of particle size of the colloidal elemental metal particles is approximately 1 nm–50 nm.

34. The method described in claim 31 comprising the additional step of recycling surfactant from the second phase.

35. A method for controlling the particle size and particle size distribution of colloidal elemental metal particles, comprising the steps of:
obtaining a quantity of a metal salt,
mixing the metal salt in a metal-salt solvent system containing a blend of a predetermined amount of a surfactant and a predetermined amount of an organic solvent, the solvent system including inverse micelles, the size and number of the inverse micelles being determined by the amount of the surfactant and the amount of the solvent blended, whereby the quantity of metal salt distributes through the inverse micelles, and
reducing the metal salt to colloidal elemental metal particles having a particle sizes and particle size distribution determined by the size and number of inverse micelles in the blend.

36. A colloidal elemental metal particle product in powder form prepared by the method of claim 30.

* * * * *